United States Patent
Lewis

(10) Patent No.: US 10,538,683 B2
(45) Date of Patent: Jan. 21, 2020

(54) ROOFING PRODUCTS WITH CARBON FIBER SUBSTRATE

(71) Applicant: TAMKO Building Products, Inc., Joplin, MO (US)

(72) Inventor: Rodney Lewis, Joplin, MO (US)

(73) Assignee: TAMKO Building Products LLC, Galena, KS (US)

( * ) Notice: Subject to any disclaimer, the term of this patent is extended or adjusted under 35 U.S.C. 154(b) by 659 days.

(21) Appl. No.: 14/644,719

(22) Filed: Mar. 11, 2015

(65) Prior Publication Data
US 2015/0259919 A1 Sep. 17, 2015

Related U.S. Application Data

(60) Provisional application No. 61/950,910, filed on Mar. 11, 2014.

(51) Int. Cl.
| | |
|---|---|
| *E04D 1/00* | (2006.01) |
| *C09D 127/16* | (2006.01) |
| *C09D 195/00* | (2006.01) |
| *C09D 175/04* | (2006.01) |
| *E04D 12/00* | (2006.01) |

(52) U.S. Cl.
CPC ......... *C09D 127/16* (2013.01); *C09D 175/04* (2013.01); *C09D 195/00* (2013.01); *E04D 1/00* (2013.01); *E04D 12/00* (2013.01); *E04D 2001/005* (2013.01); *Y10T 428/24149* (2015.01); *Y10T 428/30* (2015.01); *Y10T 442/2213* (2015.04)

(58) Field of Classification Search
CPC .......... E04D 1/00–12/00; B32B 11/00; B32B 11/02; B32B 11/04; B32B 11/10
USPC ............................ 442/179, 265, 349; 52/518
See application file for complete search history.

(56) References Cited

U.S. PATENT DOCUMENTS

| | | | |
|---|---|---|---|
| 6,237,288 B1 | 5/2001 | Jenkins et al. | |
| 6,942,915 B1 | 9/2005 | Kondo et al. | |
| 7,754,323 B2 | 7/2010 | Murai et al. | |
| 8,309,169 B2 | 11/2012 | Teng et al. | |
| 2003/0209305 A1 | 11/2003 | Smith et al. | |
| 2008/0299852 A1 | 12/2008 | Lee et al. | |
| 2009/0053529 A1* | 2/2009 | Kenney | B32B 27/08 428/422 |
| 2010/0178487 A1* | 7/2010 | Arai | C08J 5/24 428/300.1 |
| 2011/0151235 A1 | 6/2011 | Arai et al. | |

(Continued)

FOREIGN PATENT DOCUMENTS

EP    1736609 A1    12/2006

*Primary Examiner* — Matthew D Matzek
(74) *Attorney, Agent, or Firm* — Husch Blackwell LLP

(57) ABSTRACT

A roofing material comprising a substrate constructed at least in part of a carbon fiber material and a weather-resistant or water-proof coating affixed or applied to the substrate. Aesthetic or reflective materials may be applied to the exposed portion of said roofing material. The substrate may include woven and/or nonwoven fibers. The substrate may comprise a single layer or two or more layers of carbon-fiber material laminated by one or more binding layer. In addition, the present roofing material may include a bonding agent or primer for promoting adhesion between one or more carbon fiber substrate layers and/or a carbon fiber substrate layer and the weather-resistant or water-proof coating.

13 Claims, 4 Drawing Sheets

(56) References Cited

U.S. PATENT DOCUMENTS

2013/0142952 A1\* 6/2013 Ruffine .................... B32B 5/02
 427/221
2015/0240494 A1\* 8/2015 Kiik ......................... E04D 1/12
 428/195.1

\* cited by examiner

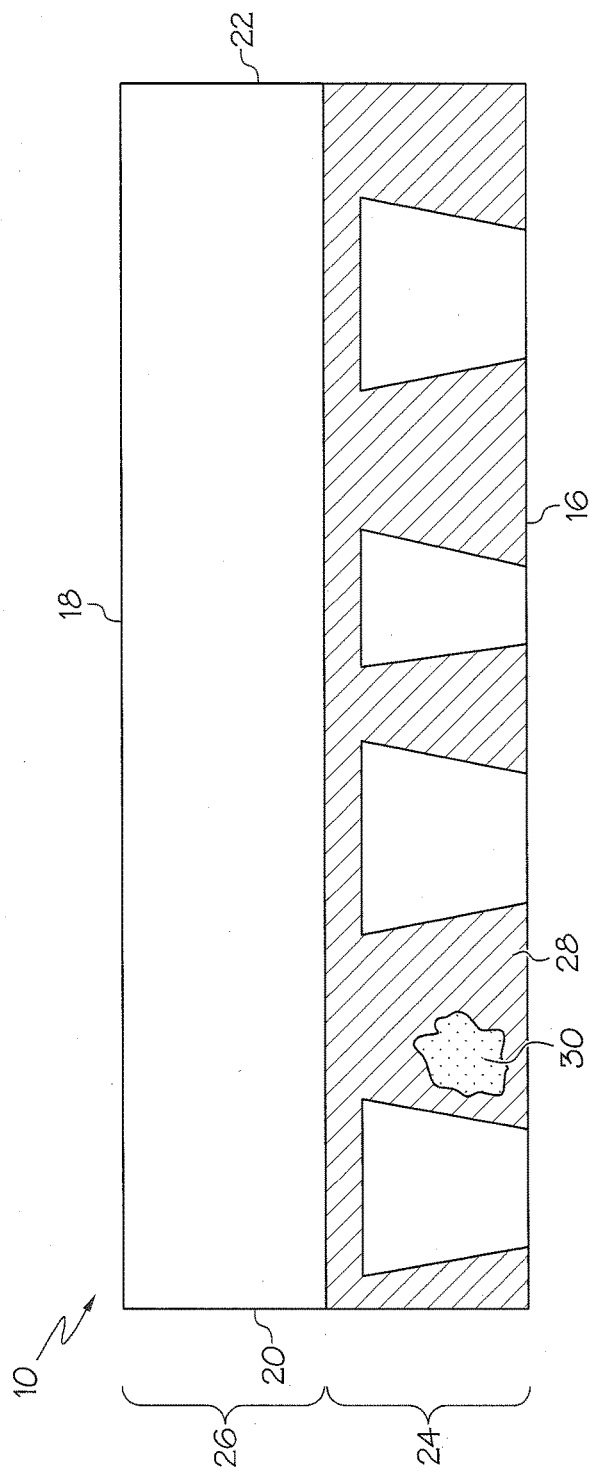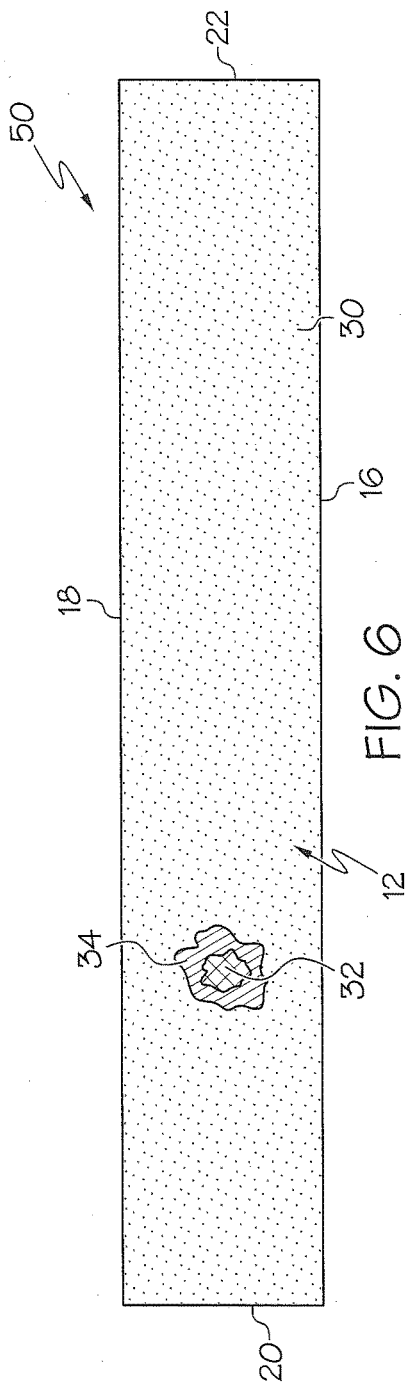

ROOFING PRODUCTS WITH CARBON FIBER SUBSTRATE

CROSS-REFERENCE TO RELATED APPLICATION

This application claims the benefit of U.S. Provisional Patent Application No. 61/950,910 filed Mar. 11, 2014, the entire disclosure of which is hereby incorporated by reference.

FIELD OF THE INVENTION

This present invention relates to a roofing product, such as a roofing tile, shingle, or roll product, which is lighter in weight and stronger than standard roofing materials or products.

BACKGROUND

Typical roofing materials include a base mat or substrate that is coated with a weather-resistant or water-proof coating and covered with a layer of ceramic granules. In the past, the base mats of such materials were primarily constructed of de-fibered wool and paper, in a combination known as "dry felt." Dry felt proved to be a popular medium for a number of years. More recently, the base mats have been constructed more regularly of a material comprising fiberglass. The primary reasons for the shift from dry felt to fiberglass were improved quality, reduced waste, faster production and reduced cost.

While the use of fiberglass as a base substrate material has resulted in a marked improvement over dry felt, it has not been without its own limitations and drawbacks. For example, while fiberglass has resulted in a reduction in waste as compared to dry felt, it still generally leads to a raw material waste of between about 5% and 10% during manufacture. Additionally, while the use of fiberglass provides a relative strong roofing material, it is common to add further reinforcing media and to utilize additional manufacturing processes in order to provide a product with improved durability so as to decrease the chances of fastener pull-through, mitigate damage caused by the impact of falling objects such as hail and mitigate damage caused by strong winds. These additional materials and processes result in roofing products that are more complex and expensive to manufacture, as well as heavier in weight.

Accordingly, a need exists for roofing materials that are yet stronger, easier to manufacture and lighter in weight.

SUMMARY OF INVENTION

The present invention is directed toward roofing products, coated or affixed with a weather-resistant or water-proof coating that includes a substrate comprising carbon fiber, graphite fiber, carbon graphite, a similar material, or any combination thereof. An embodiment of the present roofing product is a tile or shingle that has a top side, a bottom side, a leading edge, a trailing edge, a first end and a second end. An embodiment of the present roofing product may have a tab portion and a headlap portion, wherein the top side of the tab portion is intended to be exposed when installed on a roof. A present roofing tile or shingle may also include granules, reflective coatings, or aesthetic media applied to the coating on the top side of the tab portion. Another embodiment includes the present roofing product being a roll-type roofing product. Granules or fine aggregate may also be applied to the remaining top-side and/or bottom side of the present roofing product. In addition, an embodiment of the present roofing tile or roofing shingle may include other features, such as a headlap mask, reinforcing member, or replacing the bottom coating layer with a liquid release agent or a fabric layer, is also within the scope of the present invention.

In one embodiment, the fibers forming the substrate may be woven, nonwoven (chopped) or a combination thereof. In another embodiment, the substrate may be constructed of fibers having a diameter of between about 5-10 micrometers and composed primarily of carbon atoms. A carbon fiber substrate material may include polyacrylonitrile (PAN), pure carbon, carbon-fiberglass composites, carbon-Kevlar® composites or any other suitable material or composite now known or hereafter developed. In another embodiment, the substrate may be constructed of a graphene material in the form of a honeycombed lattice of graphite molecules. A bonding agent may be incorporated into the coating or otherwise applied to the substrate to improve adhesion between other substrate layers and/or with the weather-resistant or water-proof coating.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views:

FIG. 5 is a top plan view of a laminated roofing product in accordance with another embodiment of the present invention; and FIG. 6 is a top plan view of a roll roofing product in accordance with another embodiment of the present invention.

DETAILED DESCRIPTION OF THE INVENTION

Figure 1:
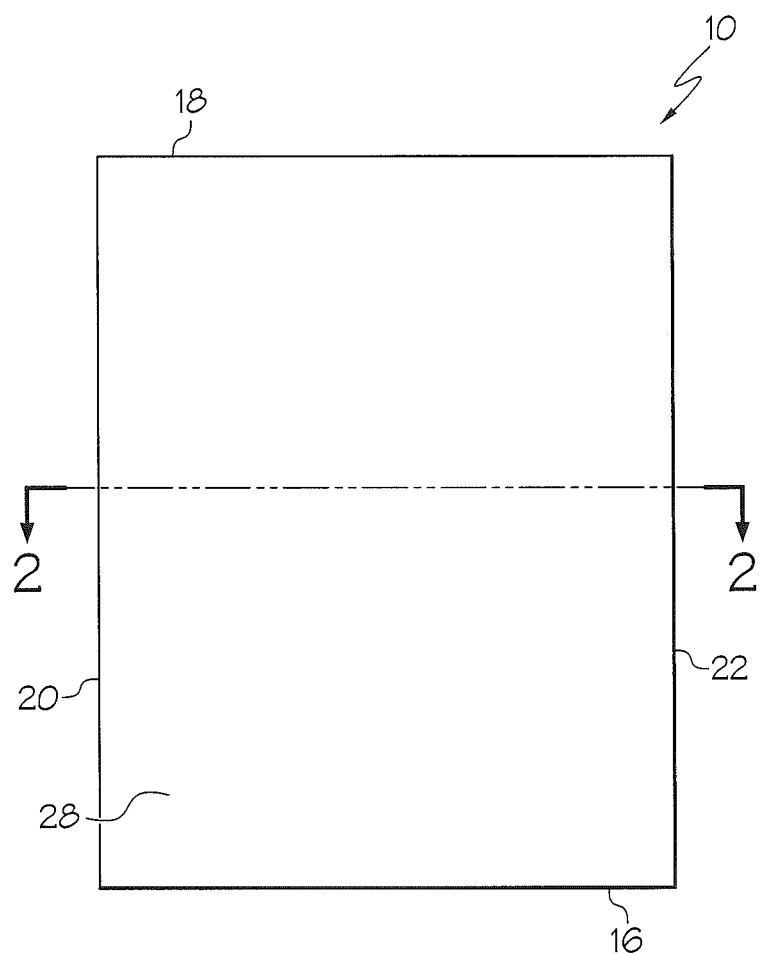
FIG. 1 is a top plan view of a roofing tile in accordance with an embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The entire disclosure of U.S. patent application Ser. No. 14/203,877 filed Mar. 11, 2014 to David C. Humphreys et al. entitled "Asphalt Shingle with Head-Lap Mask," currently pending (the "'877 Application"), is incorporated herein by reference.

The entire disclosure of U.S. patent application Ser. No. 14/622,847 filed Feb. 14, 2015 to David C. Humphreys entitled "Lightweight Roofing Shingle and Method for Making the Same," currently pending (the "'847 Application"), is incorporated herein by reference.

The entire disclosure of U.S. patent application Ser. No. 14/622,855 filed Feb. 14, 2015 to David C. Humphreys entitled "Liquid Release Agent and Associated Methods of Application," currently pending (the "'855 Application"), is incorporated herein by reference.

Figure 2:
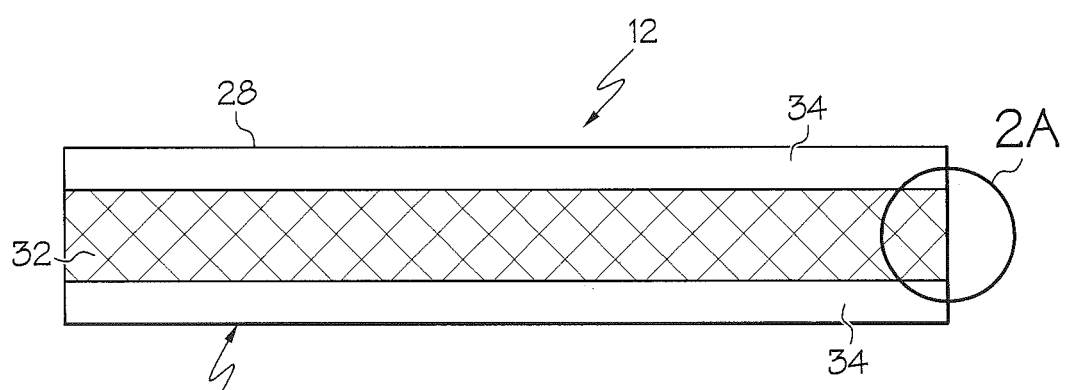
FIG. 2 is a cross-sectional view of the roofing tile of FIG. 1 cut along the line 2-2 in the direction of the arrows.

The present invention is directed generally to a roofing product comprising a base substrate or substrate constructed, at least in part, of carbon fiber or a similar material. As shown in FIG. 1, one embodiment comprising a roofing tile or shingle 10 of the present invention includes a top side 12, a bottom side 14, a leading edge 16, and a trailing edge 18. As shown in FIG. 1, shingle 10 further includes a first end 20 and a second end 22. Roofing tile or shingle 10 may be a substantially rigid polymer having a textured or smooth exposed surface 28 as shown. Alternatively, roofing tile or shingle 10 may include an exposed surface 28 that is covered by granules which will be exposed to the elements when installed. FIG. 2 shows a cross-section of the single of FIG. 1 showing the substrate 32 covered by an upper and lower coating layer 34. FIG. 2 illustrates an embodiment wherein substrate 32 is a single layer.

Figure 2A:
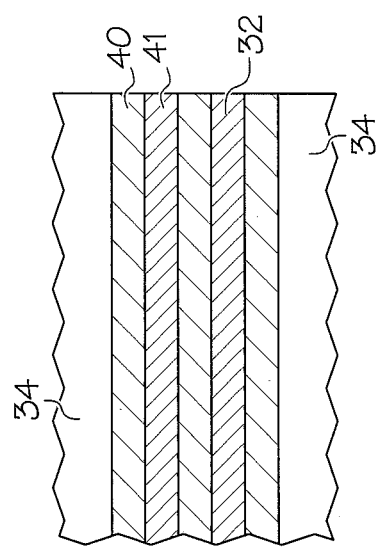
FIG. 2A is an enlarged sectional view of the substrate of the roofing tile of FIG. 2 showing an embodiment wherein the substrate comprises a layered or laminated construction.

FIG. 2A shows an enlarged portion of alternative embodiment in which substrate 32 comprises multiple layers of the carbon-fiber or substrate material 40 bound together with a binding layer 41. Binding layer 41 may be any known binder in the art. Binding layer 41 may be selected to improve strength or durability. In one embodiment, the binding layer 41 may be the bonding agent 33 as described herein. Alternatively, in another embodiment, the binding layer 41 may be the coating material 34 as described herein. Substrate 32 may comprise any number of layers desired by the person of skill in the art. The number of layers may be dependent upon the thickness of the material itself and in some embodiments may be in the single digits. In another embodiment, the number of layers may be in the tens of thousands for a very thin substrate material such as graphene. In one embodiment, substrate 32 includes at least three layers of carbon-fiber material 40 and two layers of binding layer 41 as shown in FIG. 2A.

The substrate 32 may be comprised of carbon fiber, graphite fiber, carbon graphite or a similar material. The fibers forming the substrate may be woven, nonwoven (chopped), or a combination thereof, depending upon the desired characteristics and specifications of the shingle 10. In one embodiment, the substrate 32 is constructed of fibers having a diameter of between about 5-10 micro-meters and composed primarily of carbon atoms. The carbon fiber material may include polyacrylonitrile (PAN), pure carbon, carbon-fiberglass composites, carbon-Kevlar® composites or any other suitable material or composite now known or hereafter developed. In another embodiment, the substrate 32 is constructed of a graphene material in the form of one or more layers of honeycombed lattice(s) of graphite molecules, which may be in a laminated construction.

The weather-resistant or water-proof coating 34 may be comprised of any weather-resistant or water-proof material including: asphalt, acrylic, urethane, polyvinylidene fluoride (PVDF), plastic, clay or bituminous compounds. These coatings may or may not include inert or low cost fillers such as limestone. The coatings may be rigid or flexible, hard or soft. In one embodiment, an asphalt coating is applied directly to the carbon fiber substrate 32 without the use of a bonding agent or primer. However, in other embodiments, a bonding agent 33 or primer may be utilized in order to promote adhesion and bonding between the coating 34 and the carbon fiber material. The bonding agent or primer may be mixed into the coating prior to its application to the carbon fiber material, may be applied to the carbon fiber material prior to the coating being applied to the carbon fiber material, or a combination of the foregoing. Such bonding agent or primer may include, for example, TAM-PRO 813 or 814 Low VOC Asphalt Primer distributed by TAMKO Building Products, Inc. or any other suitable bonding agent or primer now known or hereafter developed.

Figure 3:
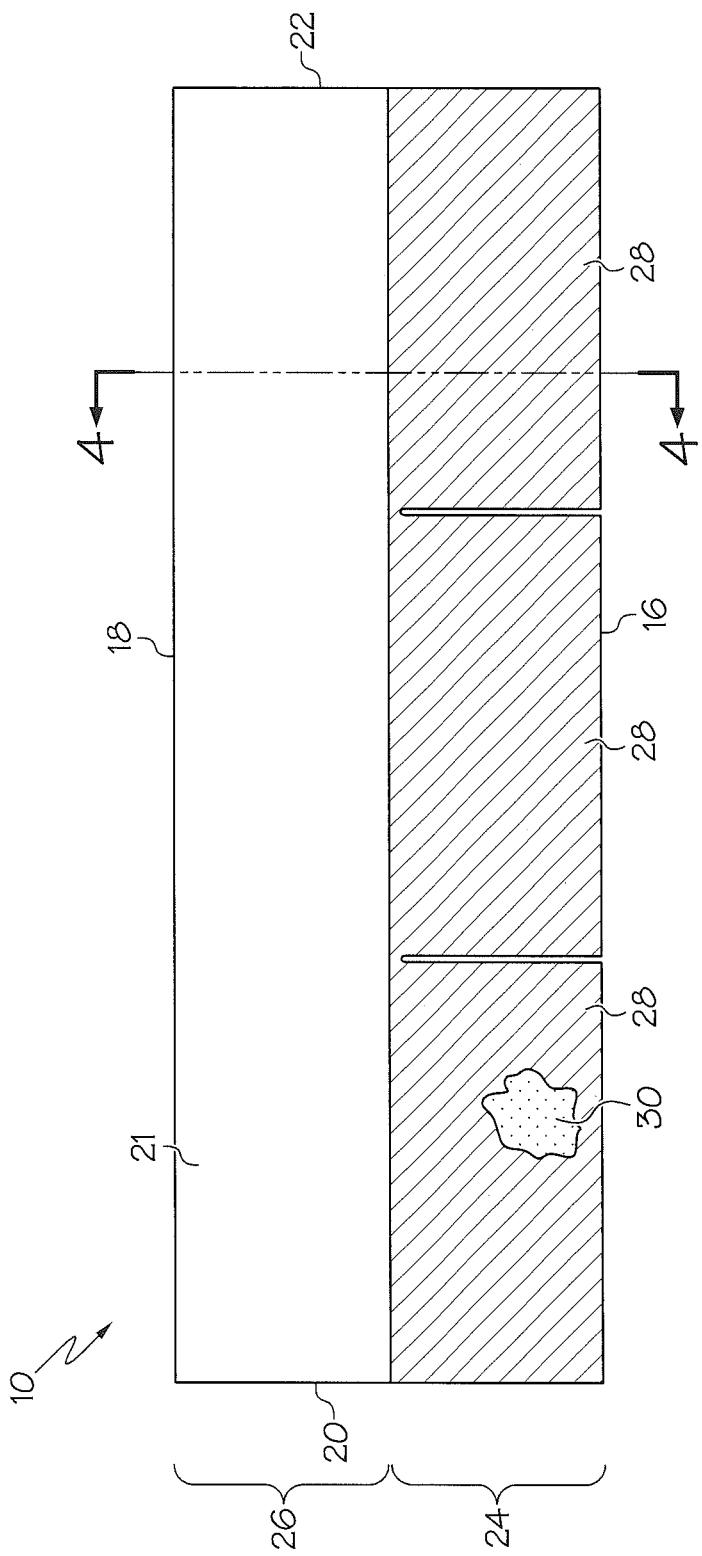
FIG. 3 is a top plan view of a three-tab roofing product in accordance with another embodiment of the present invention.

FIG. 3 illustrates another embodiment where shingle 10 includes a tab portion 24 and a head-lap portion 26 and shingle 10 is a three-tab shingle. As shown in FIG. 3, shingle 10 may include a wearing surface 28 that comprises granules 30. The top-side 12 of head-lap portion 26 may be covered in whole or in part by granules (not shown) and/or a film or mask 21 to prevent granules from adhering thereto, as further disclosed in the '877 Application. In an alternative embodiment, the top side 12 of head-lap portion 26 is not covered with either granules 30 or other mask 21.

Figure 4:
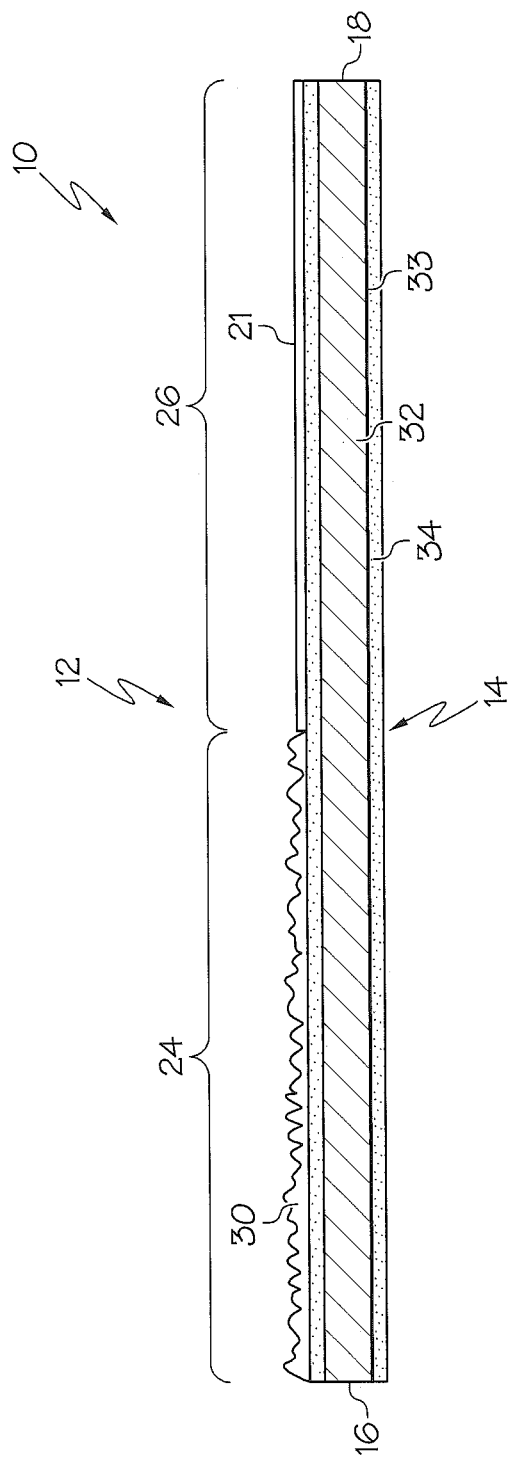
FIG. 4 is a sectional view of the roofing product of FIG. 3 taken generally along the line 3-3 in the direction of the arrows.

FIG. 4 shows a cross-section of the shingle 10 of the embodiment of FIG. 3. FIG. 4 shows substrate 32 covered with a layer of a coating material 34 on the top and bottom surfaces of substrate 32. As shown in FIG. 4, a bonding agent 33 may be applied to the substrate 32 to improve adhesion between the substrate 32 and coating layer 34. Alternatively, bonding agent 33 may be mixed into the coating layer 34 or not at all.

FIG. 5 illustrates an embodiment of the present shingle 10 that is a laminated, multilayer shingle having a similar construction to the shingle of FIG. 4, but with an additional laminated layer at least in the tab portion 24.

As illustrated in FIGS. 2, 2A and 4, one embodiment of the shingle 10 comprises a substrate, carrier or base substrate 32 that may be saturated of impregnated with a weather-resistant or water-proof coating 34. The base substrate 32 may exist as a single layer or in multiple layers in a laminate construction and may be used in conjunction with bonding agent 33 and/or coating layer 34. A coating layer 34 may be applied over the top and bottom surfaces 12 and 14. The Figures also depict an aesthetic or protective surfacing material 30 as applied to the tab portion 24 of shingle 10. Such surfacing may be applied to the entire top side 12 of shingle 10. It will be appreciated that fine matter or release agents including liquid surfactants may also be applied to the bottom surface 14 of the shingle 10 in order to prevent stacked shingles 10 from sticking together. Additionally, bottom side 12 of shingle 10 may have one or more fabric reinforcing layers (not shown) applied in whole or in part thereon. The fabric reinforcing layers may be applied over the bottom-side coating layer 34 or may be applied substantially in place of the coating layer 34.

FIG. 6 illustrates one embodiment of a commercial roofing roll product 50 which is similarly constructed using a base substrate 32 including one or more carbon fiber layers and coated with weather-resistant or water-proof coating 34. A wearing surface, such as granules 30 may be further applied to the top surface 12. Further yet, it will be appreciated that the present invention may also be applied in connection with non-roofing asphalt-based products.

In following the embodiments described herein, it will be appreciated that the present invention may also be implemented in connection with a variety of other roofing products such as commercial roofing products, cap sheets, ply base sheets, flashing and composite shingles among other roofing products now known or hereafter developed.

The use of carbon fiber in roofing products has the advantage of improving quality, increasing strength, reducing weight, imparting fire resistance, simplifying the manufacturing process, reducing cost and reducing raw material waste.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A roofing material comprising:
a substrate comprising a carbon fiber material comprising at least one of woven or non-woven carbon fibers, the substrate having a top side and a bottom side;
a weather-proof or water-resistant coating applied or affixed to at least one of said top side or said bottom side of said substrate, said weather-proof or water-resistant coating comprising an asphalt or bituminous medium; and
wherein the substrate comprises a laminated construction, the laminated construction comprising at least a first layer of carbon fiber material and a second layer of carbon fiber material, and at least one binding layer disposed between said first and said second carbon fiber layers, wherein said binding layer comprises an asphalt or bituminous medium.

2. The roofing material of claim 1, wherein the roofing material is a roofing shingle having a tab portion and a headlap portion, and the roofing material further comprises granules applied to said tab portion of said shingle.

3. The roofing material of claim 1, wherein the roofing material is a roofing shingle, and the roofing material further comprises a reflective coating applied to the water resistant coating of said shingle.

4. The roofing material of claim 1, wherein said carbon fiber material comprises only woven fibers.

5. The roofing material of claim 1, wherein said carbon fiber material comprises only non-woven fibers.

6. The roofing material of claim 1, wherein said carbon fiber material includes graphene, graphene laminates, or one or more honey-combed lattice of graphite molecules.

7. The roofing material of claim 1, further comprising a bonding agent disposed between said substrate and said weather-proof or water-resistant coating.

8. The roofing material of claim 1, wherein said weather-proof or water-resistant coating comprises a bonding agent.

9. The roofing material of claim 1, wherein said carbon fiber material comprises one or more of polyacrylonitrile (PAN), pure carbon, carbon-fiberglass composites, or graphene material in the form of a honeycombed lattice of graphite molecules.

10. The roofing material of claim 1, further comprising a film layer adhered to the asphalt coating on a head-lap portion of a first surface; and a layer of granules adhered to the asphalt coating on a tab portion of a first surface.

11. The roofing material of claim 1, further comprising;
a top asphalt layer applied to the top side of the substrate;
a layer of granular material applied to the top asphalt layer opposite the substrate; and
a reinforcing layer adhered directly to the bottom side of the substrate.

12. An asphalt roofing shingle comprising:
a substrate comprising a carbon fiber material comprising at least one of woven or non-woven carbon fibers, the substrate having an exposed side and an unexposed side;
a flexible asphalt or bituminous coating applied to at least the exposed side of said substrate; and
wherein the substrate comprises a laminated construction, the laminated construction comprising multiple carbon fiber material layers and an asphalt-based binding layer between said carbon fiber layers, wherein the asphalt-based binding layer comprises one of (i) an asphalt-based bonding agent, or (ii) the flexible asphalt or bituminous coating.

13. An asphalt coated roofing shingle comprising:
a substrate comprising a carbon fiber material comprising at least one of woven or non-woven carbon fibers, the substrate having an exposed side and an unexposed side;
a flexible asphalt or bituminous coating applied to said substrate, wherein said substrate is impregnated with said flexible asphalt or bituminous coating; and
wherein the substrate comprises a laminated construction, the laminated construction comprising a plurality of carbon fiber material layers and an asphalt-based binding layer between each of said carbon fiber layers, wherein the asphalt-based binding layer comprises one of (i) an asphalt-based bonding agent, or (ii) the flexible asphalt or bituminous coating.

* * * * *